July 29, 1958  A. SCHÄFFLER ET AL  2,845,331
PROCESS FOR THE PRODUCTION OF HYDROXYL
AMINE SULFATE SOLUTIONS
Filed April 3, 1956
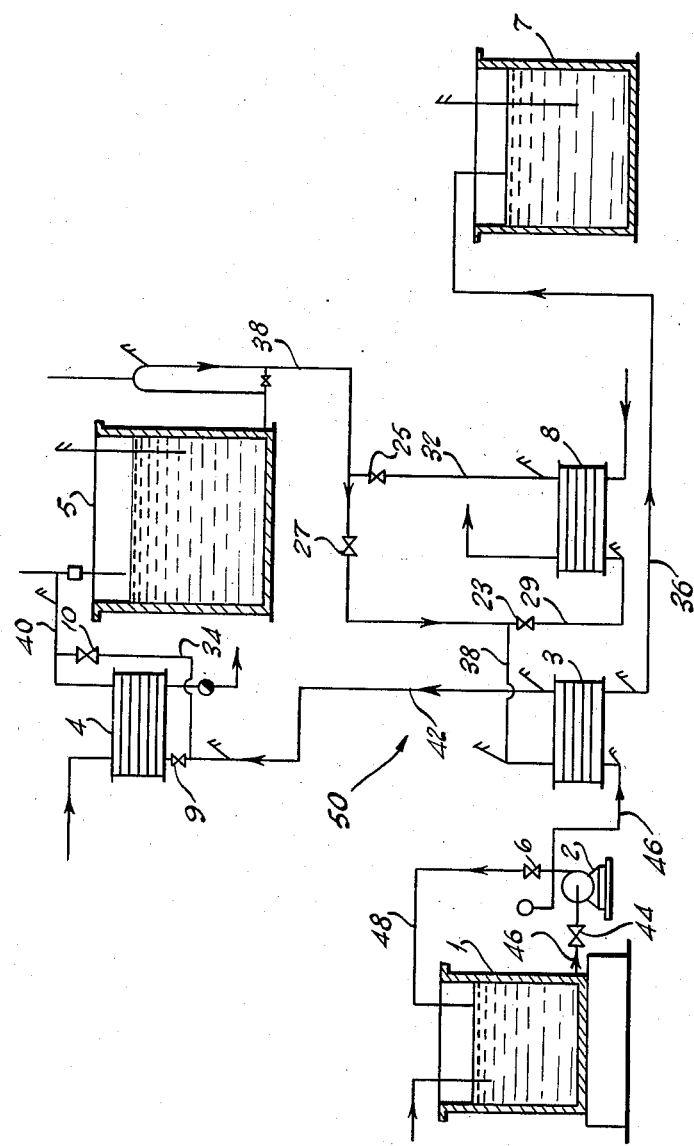
INVENTORS
ALFRED SCHÄFFLER
FRIEDRICH BACH
BY GERHARD MEIER
ATTORNEY

United States Patent Office 2,845,331
Patented July 29, 1958

2,845,331

PROCESS FOR THE PRODUCTION OF HYDROXYL AMINE SULFATE SOLUTIONS

Alfred Schäffler, Friedrich Bach, and Gerhard Meier, Leuna, Germany, assignors to Veb Leuna-Werke "Walter Ulbricht," Leuna, Germany Application April 3, 1956, Serial No. 575,879

10 Claims. (Cl. 23—117)

This invention relates to hydroxyl amine sulfate and is particularly concerned with a process and plant for the manufacture of aqueous hydroxyl amine sulfate solutions.

It is an object of this invention to provide a continuous process for the manufacture of aqueous hydroxyl amine sulfate solutions, wherein no heat has to be supplied to the process once the reaction has been initiated.

Considered from another aspect, the invention has as its object to utilize the heat set free in the manufacture of aqueous hydroxyl amine sulfate solutions by hydrolysis from aqueous salt solutions of hydroxyl amine disulfonic acid.

Another object of this invention is the provision of a plant or apparatus suitable for the continuous manufacture of aqueous hydroxyl amine sulfate solutions.

Still another object of the invention is generally to improve on processes and plants for the manufacture of aqueous hydroxyl amine sulfate solutions as now customarily practised and constructed, respectively.

Other objects of the invention will become apparent from the following description and the accompanying drawing forming part of this application.

The inventive process is based on the consideration that the alkali or ammonium salts of hydroxyl amine disulfonic acid in aqueous solution may be converted into hydroxyl amine sulfate and the corresponding sulfates or bisulfates by heating the solution to relatively high temperatures. This reaction which in fact is a hydrolysis proceeds in accordance with the following formula

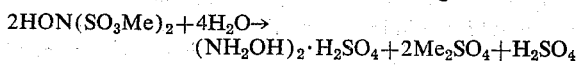

$2HON(SO_3Me)_2 + 4H_2O \rightarrow$
$(NH_2OH)_2 \cdot H_2SO_4 + 2Me_2SO_4 + H_2SO_4$ wherein Me stands for potassium, sodium or ammonium.

This reaction or hydrolysis has gained considerable importance for the manufacture of hydroxyl amine sulfate. On technical scale the process is hitherto generally carried out in such a manner, that the aqueous solutions of the salts of the hydroxyl amine disulfonic acid are first heated until a sufficiently high degree of hydrolysis is obtained, whereafter the solutions subsequently are cooled again to room temperature.

In accordance with this invention, the manufacture of hydroxyl amine sulfate solutions is carried out in a particularly advantageous and economic manner by utilizing the heat liberated during the hydrolysis of the salts of the hydroxyl amine disulfonic acid for continuously maintaining the reaction, whereby further supply of energy is rendered superfluous. The process may thus continuously be performed in a suitable plant or apparatus which latter is constructed from or lined with a material which withstands the strong chemical attacks thereon occurring during the continuous reaction. The entire plant or at least those portions thereof which come into contact with the reactants, i. e. for example the reaction vessels, the heat exchanger, and cooler, are thus advantageously constructed from resistant materials which more recently have been introduced for the construction of industrial, chemical apparatus. Igurit, which is the trade name for graphite material soaked with phenoplasts and other graphite-containing synthetic materials and the like have been found to be particularly advantageous for the purpose in question.

The inventive process may advantageously be carried out in a plant schematically and by way of example illustrated in the accompanying drawing.

Referring now to the drawing, reference numeral 50 generally indicates a plant for converting aqueous solutions of salts of hydroxyl amine disulfonic acid into hydroxyl amine sulfate solution. The plant 50 comprises a storage container 1 connected by line 46 with a heat exchanger 3. A porcelain or the like pump 2 is connected in the line 46. A return line 48 leads back from the pump 2 to the container 1. The rate of flow from the container 1 to the heat exchanger 3 may be adjusted at will by properly adjusting the valve 6 arranged in the lines 46 and 48, respectively. A line 42 connects the heat exchanger with a steam-heatable heater 4 while the latter is connected through line 40 with a relatively large reaction vessel 5. A bypass line 34 extends between the lines 42 and 40. By closing the valve 9 and opening the valve 10, it is thus possible to bypass the heater 4 and to convey fluid from the heat exchanger 3 through the lines 42, 34 and a portion of line 40 directly to the reaction vessel 5. A siphon line 38 connects the bottom outlet of the reaction vessel 5 with the heat exchanger 3 and a further line 36 is capable of conveying fluid from the heat exchanger 3 to a collecting vessel 7. A branch line 32 extends between the line 38 and a cooler 8 while the cooler 8' is connected to line 38 through line 29. By opening valve 27 and closing valves 25 and 23, fluid will flow from the reaction vessel 5 through the siphon line 38 into the heat exchanger 3. When valve 27 is closed and valves 25 and 23 are open, then fluid will flow from the reaction vessel 5 through the siphon line 38 into branch line 32 and through the cooler 8, line 29 and a portion of line 38 into the heat exchanger 3.

The level difference between the reaction vessel 5 and the collecting vessel 7 is advantageously adjusted in such a manner that the hydrostatic pressure of the solution is sufficient to assure an automatic flow from the reaction vessel 5 to the collecting vessel 7.

All the lines of the plant should preferably consist of or be lined with resistant material such as for example porcelain or—unless prohibited by the prevailing temperature—Igelit (trade name for poly vinyl chloride). The heat exchanger 3, the heater 4 and the cooler 8 are advantageously made from Igurit. The vessels 1, 5 and 7 are lined with acid-resistant material of suitable composition.

The plant here illustrated operates as follows: An aqueous solution of salts of hydroxyl amine disulfonic acid is continuously pumped by the pump 2 through line 46, heat exchanger 3, line 42, the steam-heated heater 4, and line 40 into the reaction vessel 5. As previously explained, the rate of flow can be adjusted by the valve 6. The hydrolysis proper takes place within the reaction vessel 5. Since the second sulfogroup of the salts of the hydroxyl amine disulfonic acid is split off relatively slowly, the size of the reaction vessel 5 should be chosen large enough so that a sufficiently long period of time of the solution to be hydrolyzed within said vessel 5 is assured. The hydrolyzed solution flows continuously through the siphon line 38 back to the heat exchanger 3 wherefrom it is conveyed through line 36 into the collecting vessel 7.

The reaction heat set free during the hydrolysis is utilized to maintain continuously the hydrolysis after once having been started, without necessitating the supply of further energy. For this purpose, the heat exchanger 3 should be dimensioned and constructed in such a manner, that the heat of the hot hydroxyl amine sulfate solution discharged from the reaction vessel 5 is dissipated and taken up within the heat exchanger 3 by the counter-flowing, cold hydroxyl amine disulfonic acid solution supplied from the container 1. The hydrolysis is thus started in the solution supplied from the container 1 and the liberated energy is sufficient to maintain the reaction continuously. The heater 4 is steam heated only until the solution discharged from the reaction vessel 5 is sufficiently hot so as to initiate the hydrolysis of the incoming solution in the heat exchanger 3. When the solution discharged from the reaction vessel 5 has reached such a temperature, steam supply to the heater 4 is discontinued and the entering solution is directly conveyed to the reaction vessel 5 without passing through the heater 4. This is accomplished by closing the valve 9 in line 42 and opening valve 10, whereby the solution is forced to pass through line 34. The solution discharged from the reaction vessel 5 passes normally through line 38 into the heat exchanger 3 and therefrom into the collecting vessel 7. The valves 25 and 23 are thus normally closed so that the cooler is not connected in the circuit. However, in case the operation is to be discontinued, valve 27 is shut and valves 23 and 25 are opened, whereby the solution discharged from the reaction vessel 5 flows by gravity through line 32, the cooler 8, line 29, a partion of line 38, the heat exchanger 3 and line 36 into the collecting vessel 7. In this case the solution is thus cooled in the cooler prior to reaching the collecting vessel 7. The cooler 8 is thus only in operation when the operation is to be finished and no fresh solution is supplied from the container 1.

The solution of hydroxyl amine sulfate obtained in the collecting vessel 7 may be used directly for a multitude of purposes, for example for the oxime-formation of ketones or for the manufacture of solid hydroxyl amine sulfate.

The inventive process will now be described by an example, but it should be understood that this example is given by way of illustration rather than by way of limitation, and that many variations may be made in for example the reaction conditions in general without departing in any way from the spirit and scope of the invention.

*Example*

The process to be described is carried out in a plant of above described construction. 3300 liters of an aqueous solution containing 173 to 187 grams of the ammonium salt of hydroxyl amine disulfonic acid per liter of solution are continuously fed to the heat exchanger at a temperature of about 1 to 50° C. Hot hydroxyl amine sulfate solution discharged from the reaction vessel and flowing in counter current relation to the hydroxyl amine disulfonic acid solution heats the latter in the heat exchanger to about 90–95° C. thus initiating the hydrolysis. The hydroxyl amine disulfonic acid solution reaches the reaction vessel at this temperature and hydrolyzes therein to form hydroxyl amine sulfate solution. The heat liberated during the hydrolysis increases the temperature of the reaction liquor to 100–104° C. The reaction liquor is left in the reaction vessel for about 4 hours. The hot, hydrolyzed solution is conveyed back to the heat exchanger and is cooled therein by fresh, cold starting solution to 20–25° C. The final solution obtained contains 125–130 grams per liter of hydroxyl amine sulfate.

We have described hereinabove preferred embodiments of the process and the plant for the manufacture of hydroxyl amine sulfate solution. However, it should be understood that various modifications, substitutions of equivalents and changes may be made without departing in any way from the scope and spirit of this invention.

What we claim is:

1. A process for the production of aqueous hydroxyl amine sulfate solutions, comprising the steps of heating a first quantity of an aqueous solution of a compound having the formula $HON(SO_3Me)_2$ wherein Me is selected from the group consisting of ammonium, potassium and sodium, to a temperature at which an exothermic hydrolysis sets in, allowing said first quantity of said solution thereafter to stand until said hydrolysis is completed and a first quantity of a hot aqueous solution of hydroxyl amine sulfate is obtained, dissipating heat from said first quantity of said hot aqueous solution of hydroxyl amine sulfate for heating a second quantity of an aqueous solution of said compound, to at least a temperature at which an exothermic hydrolysis of said second quantity of solution is initiated, and allowing said second quantity thereafter to stand until the hydrolysis therein is completed and a second quantity of hot aqueous solution of hydroxyl amine sulfate is obtained.

2. In a process as claimed in claim 1, wherein heat is dissipated from said second quantity of hot aqueous solution of hyroxyl amine sulfate to heat a third quantity of aqueous solution of said compound to a temperature at which exothermic hydrolysis sets in, allowing said third quantity of solution thereafter to stand until the hydrolysis is completed therein and, a third quantity of hot aqueous solution of hydroxyl amine sulfate is obtained, and said dissipation of heat for heating aqueous solutions of said compound until exothermic hydrolysis sets in is continued any desired number of times, whereby any desired numbers of quantities of aqueous solutions of hydroxyl amine sulfate are obtained.

3. In a process as claimed in claim 1, wherein said dissipation of heat is effected by heat exchanges.

4. In a process as claimed in claim 1, wherein said first quantity of aqueous solution of said compound is heated to about 90–95° C.

5. In a process as claimed in claim 1, wherein said second quantity of said aqueous solution of said compound has a temperature of about 1–5° C. prior to said heating by said first quantity of aqueous solution of said hydroxyl amine sulfate.

6. In a process as claimed in claim 1, wherein said second quantity of said aqueous solution of said compound is heated after about four hours subsequent to the heating of said first quantity of said aqueous solution of said compound.

7. A process for the production of aqueous hydroxyl amine sulfate solutions, comprising the steps of supplying a first quantity of a hot aqueous solution of a compound having the formula $HON(SO_3Me)_2$ wherein Me is selected from the group consisting of ammonium, potassium and sodium to a reaction vessel, leaving said first quantity of said hot aqueous solution in said reaction vessel until it has hydrolyzed to yield a first quantity of hot hydroxyl amine sulfate solution, discharging said first quantity of hot hydroxyl amine sulfate solution from said reaction vessel through a heat exchanger for heating therein a second quantity of cold aqueous solution of said compound to a temperature at which exothermic hydrolysis sets in, conveying said second quantity of said aqueous solution of said hydrolyzing compound to said reaction vessel, and allowing said second quantity of said hydrolyzing solution to remain in said reaction vessel until the hydrolysis is completed and a second quantity of hot hydroxyl amine sulfate solution is obtained.

8. In a process as claimed in claim 7, wherein said discharged first quantity of hydroxyl amine solution and said second quantity of aqueous solution of said compound flow through said heat exchanger in counter-current.

9. In a process as claimed in claim 7, discharging said second quantity of hot hydroxyl amine sulfate solution from said reaction vessel through said heat exchanger to heat a third quantity of a cold aqueous solution of said compound, until exothermic hydrolysis sets in, conveying said hydrolyzing third quantity to said reaction vessel, leaving said hydrolyzing third quantity in said reaction vessel until the hydrolysis is completed and a third quantity of hydroxyl amine sulfate is obtained and continuing the utilization of heat by heat exchange for initiating exothemric hydrolysis any desired number of times, whereby any desired number of quantities of aqueous hydroxyl amine sulfate solutions are obtained.

10. In a process for the continuous batchwise manufacture of aqueous hydroxyl amine sulfate solutions, the improvement eliminating the requirement for supplying any external heat once the reaction of a first batch has been activated, comprising, heating a first quantity of an aqueous solution of a compound having a formula $HON(SO_3Me)_2$ wherein Me is selected from the group consisting of ammonium, potassium and sodium to a temperature at which an exothermic hydrolysis sets in, allowing said first quantity of said solution thereafter to stand until said hydrolysis is completed and a first quantity of a hot aqueous solution of hydroxyl amine sulfate is obtained, dissipating heat from said first quantity of said hot aqueous solution of hydroxyl amine sulfate for heating a second quantity of an aqueous solution of said compound to at least a temperature at which an exothermic hydroylsis of said second quantity of solution is initiated, and allowing said second quantity thereafter to stand until the hydrolysis therein is completed and a second quantity of hot aqueous solution of hydroxyl amine sulfate is obtained.

References Cited in the file of this patent

UNITED STATES PATENTS

| | | |
|---|---|---|
| 1,743,185 | Bernard | Jan. 14, 1930 |
| 1,789,460 | Clark | Jan. 20, 1931 |
| 2,235,401 | Gier | Mar. 18, 1941 |
| 2,555,667 | Zeegers | June 5, 1951 |

FOREIGN PATENTS

| | | |
|---|---|---|
| 668,610 | Great Britain | Mar. 19, 1952 |